(12) United States Patent
Scherbarth

(10) Patent No.: US 8,419,318 B2
(45) Date of Patent: Apr. 16, 2013

(54) METHOD OF MILLING BALL RACES AND SIDE MILLING CUTTER FOR BALL RACES

(75) Inventor: Stefan Scherbarth, Bietigheim-Bissingen (DE)

(73) Assignee: Sandvik Intellectual Property AB, Sandviken (SE)

( * ) Notice: Subject to any disclaimer, the term of this patent is extended or adjusted under 35 U.S.C. 154(b) by 480 days.

(21) Appl. No.: 12/666,234

(22) PCT Filed: Jul. 2, 2008

(86) PCT No.: PCT/EP2008/058474
§ 371 (c)(1),
(2), (4) Date: Mar. 24, 2010

(87) PCT Pub. No.: WO2009/007280
PCT Pub. Date: Jan. 15, 2009

(65) Prior Publication Data
US 2010/0209202 A1    Aug. 19, 2010

(30) Foreign Application Priority Data
Jul. 6, 2007   (DE) .................. 10 2007 031 695

(51) Int. Cl.
*B23C 5/12* (2006.01)
*B23C 3/32* (2006.01)

(52) U.S. Cl.
USPC .............................................. 407/56; 407/31

(58) Field of Classification Search .......... 407/31, 407/20, 56, 58, 61, 23; 409/131, 132
See application file for complete search history.

(56) References Cited

U.S. PATENT DOCUMENTS

| | | | | |
|---|---|---|---|---|
| 2,736,239 A | * | 2/1956 | Higashi et al. | 409/41 |
| 3,162,987 A | * | 12/1964 | Cronin et al. | 451/48 |
| 3,670,380 A | * | 6/1972 | Moore et al. | 407/40 |
| 4,799,836 A | * | 1/1989 | Kurisu et al. | 409/138 |
| 5,511,913 A | * | 4/1996 | Naumann | 409/131 |
| 6,183,173 B1 | * | 2/2001 | Ritter | 408/59 |
| 6,485,236 B1 | * | 11/2002 | Engeli et al. | 409/132 |
| 6,811,360 B1 | | 11/2004 | Scherbarth | |
| 7,475,469 B2 | | 1/2009 | Stanik et al. | |
| 2005/0186036 A1 | * | 8/2005 | Doerfel et al. | 407/31 |
| 2006/0283016 A1 | | 12/2006 | Cremerius | |
| 2007/0104550 A1 | | 5/2007 | Cremerius | |

FOREIGN PATENT DOCUMENTS

| | | |
|---|---|---|
| DE | 93 16 953.1 | 6/1994 |
| DE | 10 2004 008 872 | 9/2005 |
| WO | 01/38029 | 5/2001 |
| WO | 03/053617 | 7/2003 |
| WO | 2006/058555 | 6/2006 |
| WO | 2006/058556 | 6/2006 |

\* cited by examiner

*Primary Examiner* — Will Fridie, Jr.
(74) *Attorney, Agent, or Firm* — Morgan, Lewis & Bockius LLP

(57) ABSTRACT

The present invention concerns a method of milling ball races which are of an approximately elliptical profile which has a first semi-axis extending substantially perpendicularly to the base of the ball race and a second semi-axis extending perpendicularly to the first semi-axis and perpendicularly to the longitudinal direction of the ball race, wherein a side milling cutter is used to produce the ball race, the peripheral cutting edges of which produce the elliptical profile of the ball race, wherein the cutting edges of the side milling cutter in a section containing the axis of the milling cutter are also of an elliptical profile whose first semi-axis extends perpendicularly to the milling cutter axis and whose second semi-axis extends parallel to the milling cutter axis.

13 Claims, 3 Drawing Sheets

Figure 4:
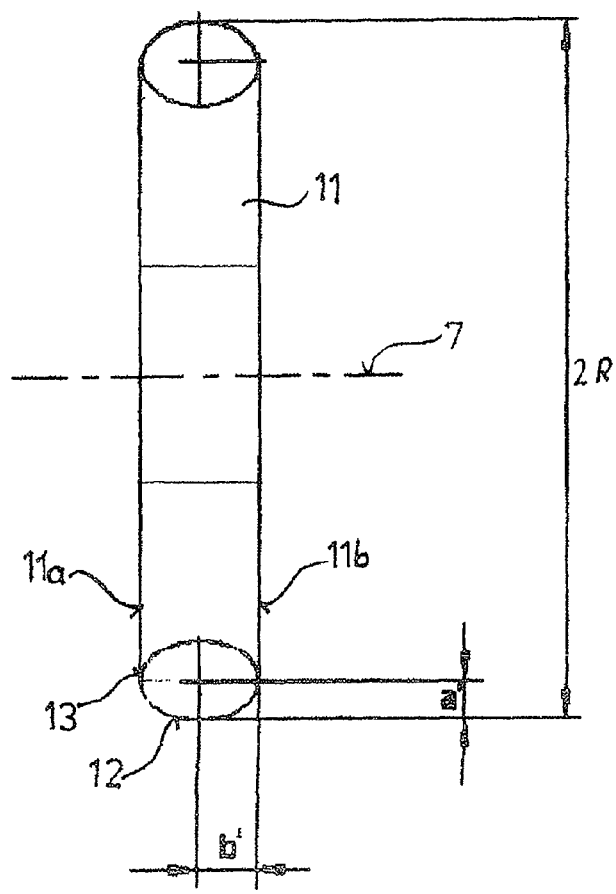

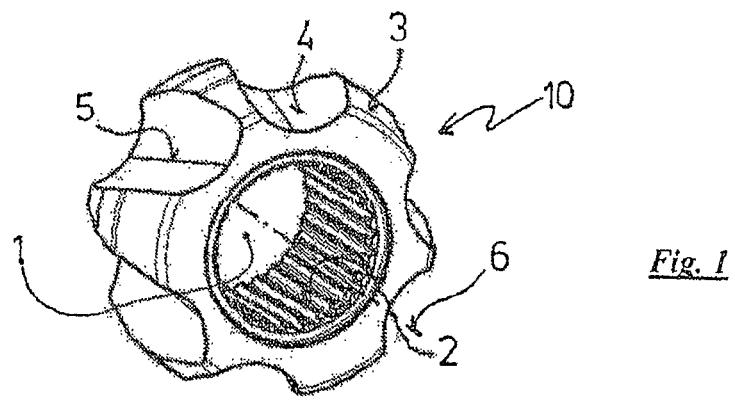
*Fig. 1*
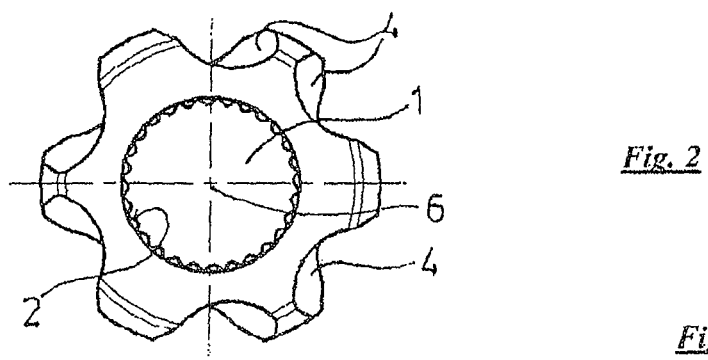
*Fig. 2*
*Fig. 3*
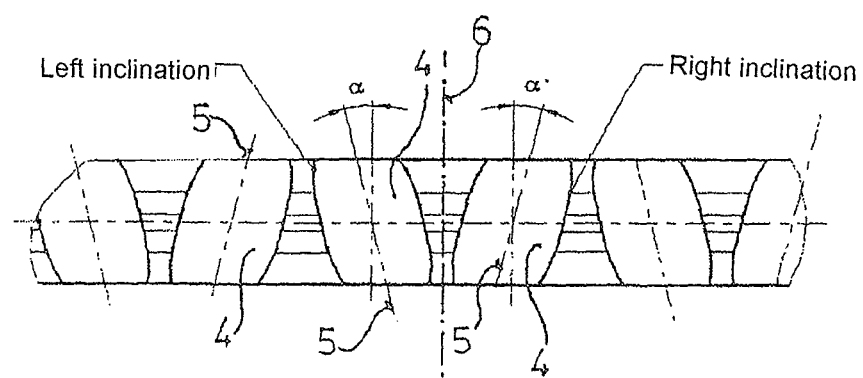

METHOD OF MILLING BALL RACES AND SIDE MILLING CUTTER FOR BALL RACES

RELATED APPLICATION DATA

This application is a §371 National Stage Application of PCT International Application No. PCT/EP2008/058474 filed Jul. 2, 2008, and also claims priority under 35 U.S.C. §119 and/or §365 to German Application No. 10 2007 031 695.1, filed Jul. 6, 2007.

The present invention concerns a method of milling ball races of an approximately elliptical profile having a first semi-axis a which extends in the direction of the normal to the base of the ball race and a second semi-axis b extending perpendicularly to the first semi-axis a and perpendicularly to the longitudinal direction c of the ball race, wherein to produce the ball race use is made of a side milling cutter, the peripheral cutting edges of which cut or form the elliptical profile of the ball race, wherein the cutting edges of the side milling cutter in a section containing the axis of the milling cutter in turn are of an elliptical profile, by means of which the elliptical profile of the ball race is produced.

Such ball race milling cutters in the form of a side milling cutters have long been known and likewise the corresponding methods are also known, for producing the ball race profile by the rotating side milling cutter, by a procedure whereby the side milling cutter is oriented relative to a corresponding workpiece in such a way that the longitudinal direction of the ball race falls in the plane of rotation of the side milling cutter or is parallel thereto and perpendicular to the axis of the side milling cutter, and the side milling cutter is brought into engagement with the corresponding workpiece (for example a ball race hub), the advance movement of the milling cutter relative to the workpiece being effected perpendicularly to the milling cutter axis. The ball race profile then precisely corresponds to the profile of the cutting edges of the side milling cutter in a section containing the axis of the milling cutter. In addition other kinds of ball race milling cutters are known, for example in the form of shank or end milling cutters or form milling cutters, in which the profile of the ball race also corresponds to a section containing the axis of the milling cutter or a lateral plan view on to the milling cutter.

Finally, a ball race milling cutter is also known, which goes back to the inventor of the present application and which is in the form of a shank end milling cutter, the advance movement of which however is effected partially in the axis direction so that the milling cutter operates in part like a drill. With that milling cutter the profile of the ball race is produced by a section through the envelope of the cutting edges with a section plane inclined relative to the milling cutter axis through an angle of between more than 0° and less than 90° relative to the milling cutter axis, whereas the profile of the milling cutter in a side view differs markedly from the profile of the ball race to be produced.

Modern universal-joint shafts in motor vehicles frequently have so-called VL joints or Loebro plunging joints. Those VL joints have a hub and a ring which extends around the hub at a spacing and which by means of balls form a joint by the balls being arranged in ball races which are provided on the outside surface of the hub and on the inside surface of the corresponding ring surrounding the hub. The hub and the ring are therefore also referred to as the 'ball hub' and the 'ball ring' respectively. In that case those ball races extend in the outside wall of the ball hub and also in the inside wall of the ball ring at a setting angle relative to the axis of the ball hub and the ball ring respectively, which for example is about 15° and which is generally not below 5° and not above 40° although it is also possible in principle to implement larger or smaller angles. In that case adjacent ball races respectively extend inclinedly in opposite directions relative to the hub and ring axis respectively. The ball races which are arranged in pairs in mutually superposed relationship in the radial direction in the ball ring and the ball hub respectively are also angled in opposite directions (inclined relative to the axis of the hub and the ring) so that the ball races of the ball hub and the ball ring mutually cross, more specifically at an angle which (having regard to different signs in relation to opposite inclinations) corresponds to the difference in the setting angles of the ball races of the ball hub and the ball ring, wherein the balls are respectively arranged in the point of intersection formed in that way in respect of the ball races which are disposed in mutually opposite paired relationship. In that case the minimum spacing between the profile of the side milling cutter (more precisely an envelope surface, formed by the rotating cutting edges, about the axis of the milling cutter) and the axis of the ball hub is kept constant. Alternatively the ball hub can be turned about its axis and in that case moved with its axis inclined about the setting angle relative to the plane of rotation of the milling cutter perpendicularly to the axis of the milling cutter. At any event that is a relatively complex set of movements in respect of the relative movement between the milling cutter and the ball hub.

If ball races are introduced as described hereinbefore into a corresponding VL ball hub with a conventional disk-shaped profile cutter and the conventional method, then in addition the axis of the ball hub is tilted relative to the plane of rotation of the side milling cutter in a manner corresponding to the changing inclination of the ball races and there is then a relative movement between the outside surface of the ball hub and the axis of the side milling cutter perpendicularly to that axis and inclined at a new setting angle relative to the hub axis. To express this more graphically the base (the central base line) of the ball race then extends approximately along a helical line on a notional cylindrical surface about the hub axis.

As adjacent ball races of such a VL ball hub are angled alternately in opposite directions relative to the axis of the ball hub, that is to say they alternately involve a positive and a negative setting angle, the axis of the ball hub must be respectively inclined alternately in different directions relative to the plane of rotation of the side milling cutter or in a first clamping configuration the ball races are firstly produced with the same setting angle followed then by those with the setting angle of opposite sign, wherein the setting angles of opposite sign do not necessarily need to be of the same value.

The production of such VL hubs therefore requires relatively complex multi-axis machine tools which allow correspondingly complicated adjusting and advance movements.

Furthermore, with the conventional method and the conventional milling cutters it is in principle only possible to produce a ball race profile which precisely corresponds to the profile of the cutting edges of the ball race milling cutter, more precisely the section containing the milling cutter axis through an envelope, produced by the cutting edges, of the ball race milling cutter, that is to say the 'milling cutter profile'.

In comparison with that state of the art the object of the present invention is to provide a method of milling ball races and a corresponding side milling cutter, which on the one hand also permit the production of ball races in ball hubs of VL joints on relatively more simple machining centers, while on the other hand there is also to be the possibility of varying the profile of the ball races produced, with one and the same milling cutter.

In particular the present invention seeks to make it possible that the ball hubs of VL joints can be produced on the widespread three-axis machining centers with C-axis. That would permit a considerable reduction in the manufacturing costs.

In regard to the method defined in the opening part of this specification that object is attained in that a side milling cutter with an elliptical disk profile, in which the ratio of the second semi-axis to the first semi-axis is greater than the ratio of the second semi-axis to the first semi-axis in the profile of the ball race to be produced, wherein the axis of the side milling cutter is inclined through a setting angle different from 0° with respect to the second semi-axis of the portion of the ball race profile, with which the side milling cutter is just in engagement.

Stated in other words, the milling cutter axis is inclined relative to the base line of the ball race produced or to be produced by the milling cutter, through an angle differing from 90°. What would be equivalent thereto would be a definition of the orientation, whereby in the relative movement between the milling cutter and the ball hub, the axis of the ball hub is inclined relative to the plane of rotation of the side milling cutter (that is to say the plane perpendicular to the axis of the milling cutter) through the desired setting angle.

It will be appreciated that accordingly in production of the corresponding ball track there is superposed on the advance movement of the side milling cutter relative to the workpiece, in transverse relationship with the milling cutter axis, there is also an advance movement relative to the workpiece in the longitudinal direction of the milling cutter axis, wherein the ratio of those advance movements defines the above-mentioned setting angle. More precisely the tangent of the setting angle is given by the ratio of the advance speed in the longitudinal direction of the milling cutter axis relative to the advance speed perpendicularly to the milling cutter axis. In that case the advance speed perpendicularly to the milling cutter axis is produced by rotation of the ball hub about its axis.

A preferred embodiment of the invention in that respect is one in which the setting angle is set at between 5° and 35° and the advance speeds are correspondingly matched to each other. Particularly preferably the setting angle is between 10° and 20°.

As a result that setting angle in respect of the axis of the milling cutter relative to the large semi-axis of the ball hub profile, which at the same time also corresponds to the setting angle between the plane of rotation of the milling cutter disk relative to the longitudinal direction of the ball race, provides for the production of a ball race profile in which the ratio of the second semi-axis to the first semi-axis is smaller than in the case of the elliptical profile of the side milling cutter (viewed in a plane containing the milling cutter axis), which is vividly clear as the elliptical profile of the side milling cutter is tilted relative to the elliptical profile of the ball hub through the above-mentioned setting angle. Upon projection of the milling cutter profile into the plane of the profile of the ball race that leads to an effective reduction in the length of the second semi-axes, while the first semi-axes remain unchanged. There is however also a further aspect in that respect, which influences the precise ball race profile, namely the (maximum) radius of the side milling cutter.

In that respect the semi-axis ratio can also in particular be reversed, that is to say while the semi-axis ratio b'/a' of the milling cutter profile is greater than 1, the corresponding semi-axis ratio b/a of the ball race profile can be less than 1 and in practice is mostly of the order of magnitude of between 0.95 and 0.995. In other words, in the case of the ball race, the roles of the small and large semi-axis, with respect to the orientation of those axes in the milling cutter, are strictly speaking interchanged. The semi-axes of the ball race are in that case so selected that the race admittedly differs only slightly from a circular cross-section, in which respect however it is ensured that the radius of curvature at the base of the ball race is somewhat smaller than the ball radius, and increases in the direction of the first semi-axis and exceeds the ball radius there so that the ball in question strictly speaking rolls on two parallel lines on both sides of the base line of the ball race and at a spacing relative thereto. That guarantees better stability in respect of the raceway for the balls even after a certain wear.

The profile defined hereinbefore in relation to the state of the art of the cutting edges of the milling cutter is referred to in the context of the present invention as the 'milling cutter profile' or the 'profile of the side milling cutter', which is to be distinguished however from the profile of the ball race because of the setting angle of the milling cutter relative to the longitudinal direction of the ball race, in accordance with the present invention.

It will be appreciated that in this case the profile does not have to involve the periphery of half an ellipse, but that a smaller portion of the profile is sufficient. The ball race profile is preferably so designed that, in the strictly geometrical sense, the ball has two contact points with that profile or two parallel contact lines symmetrically relative to the base line of the ball race. In practice the radii of curvature of the balls and of the profile of the ball race are very close together in the proximity of the contact lines so that a correspondingly enlarged support line is afforded, which contributes to a lower degree of wear for the joint.

In a variant of the present invention both the first and also the second semi-axis of the ball race profile are only slightly greater (by less than 10%) than the radius of the balls provided for same while the radius of curvature at the base of the ball race profile is somewhat smaller than the radius of those balls.

In regard to the ball race milling cutter itself the object of the invention is attained in that the ratio of the second semi-axis to the first semi-axis of the profile of the side milling cutter is between 1.06 and 3.5, in particular between 1.1 and 2.5. That is typically markedly greater than the usual ratio of the second semi-axis to the first semi-axis in the case of the profile of conventional ball races and in particular is markedly greater than the semi-axis ratio of the ball race if therein the foregoing condition is observed, that both semi-axes of the elliptical ball race profile are less than 10% greater than the ball radius. Particularly preferably the ratio of the semi-axes of the milling cutter profile can be between 1.15 and 1.7.

In addition a side milling cutter whose radius is between twice and 12 times the large semi-axis of the milling cutter profile should be used for the method according to the invention. In that respect the 'radius' of the side milling cutter is defined by the maximum radius, measured from the axis of the milling cutter to the point of the elliptical milling cutter cutting edges, that is furthest remote from the axis.

As already mentioned, with the method according to the invention in practice the ball race profile is defined not only by the setting angle but also by virtue of that setting angle by the radius of the side milling cutter so that for that reason the diameter of the side milling cutter in relation to the second semi-axis of the milling cutter cutting profile should not be excessively great and is preferably between 4 and 8.

The semi-axes of the milling cutter profile, the radius of the ball (approximately corresponding to the semi-axes of the ball race), the radius of the milling cutter and the setting angle are subject to a complex mutual relationship. In principle it can be said that, with a given milling cutter radius and a given ball diameter, with an increasing setting angle, the ratio b'/a' of the semi-axes of the milling cutter profile markedly increases and also becomes correspondingly greater, the greater the ratio of the milling cutter radius to the ball radius. In contrast, with a given ball radius and a given setting angle, the absolute value of the second semi-axis b' becomes less, in which case however the first semi-axis a' decreases relatively even more.

In particular the production of VL ball hubs can be effected with the method according to the invention in such a way that the ball hub is oriented with its axis perpendicularly to the axis of the side milling cutter. During the advance movement of the side milling cutter transversely relative to its axis, that is to say in the longitudinal direction of the axis of the VL ball hub, there is also superimposed on that advance movement a second advance movement which is in the longitudinal direction of the milling cutter axis, by a procedure whereby the VL ball hub is turned about its axis so that the desired profile is produced at the periphery of the ball hub by the advance movement relative to the longitudinal axis of the side milling cutter and the simultaneous rotation of the ball hub about its axis.

In that respect it is particularly preferred for the ball hub to be mounted on a spindle, the axis of which coincides with the axis of the ball hub, wherein the spindle stroke movement is matched to the desired setting angle. It will be appreciated that, in suitably set-up machining centers, that spindle-like movement can also be simulated or reproduced without mounting of the hub on a spindle actually having to be implemented.

If required the two advance movements could also have superposed thereon a further movement transversely with respect to the milling cutter axis and the hub axis so that the shortest spacing between the two axes would be varied during the advance movement along a circular arc, the center point of which is on the hub axis and is approximately in the center between the axial ends of the ball race or the ball race hub. The ball race or the raceway of a ball in the ball race of the VL hub would then extend on the surface of a bail, the notional center point of which lies at the center of the ball hub.

In the case of the VL ball joints which are usual at the present time however the base of the ball race is on a notional cylindrical surface about the axis of the ball hub and in that case extends along a helical line. A corresponding consideration also applies to the ball races in the ball ring. That is possible for the reason that, upon tilting of the ball hub relative to the ball ring, the balls which are arranged in the points of intersection of the mutually opposite ball races assume different axial positions with respect to the ball hub on the sides of the hub in opposite relationship in the plane of tilting movement, during that tilting movement.

The radii of the cylindrical surfaces, on which the base of the ball races of the ball hub and the ball ring extends, differ in that case by somewhat more than the diameter of the balls running in the ball races, as they generally do not roll precisely on the base of a ball race but on two parallel lines extending on both sides at a spacing from the base line of a ball race and parallel to that base line.

Figure 5:
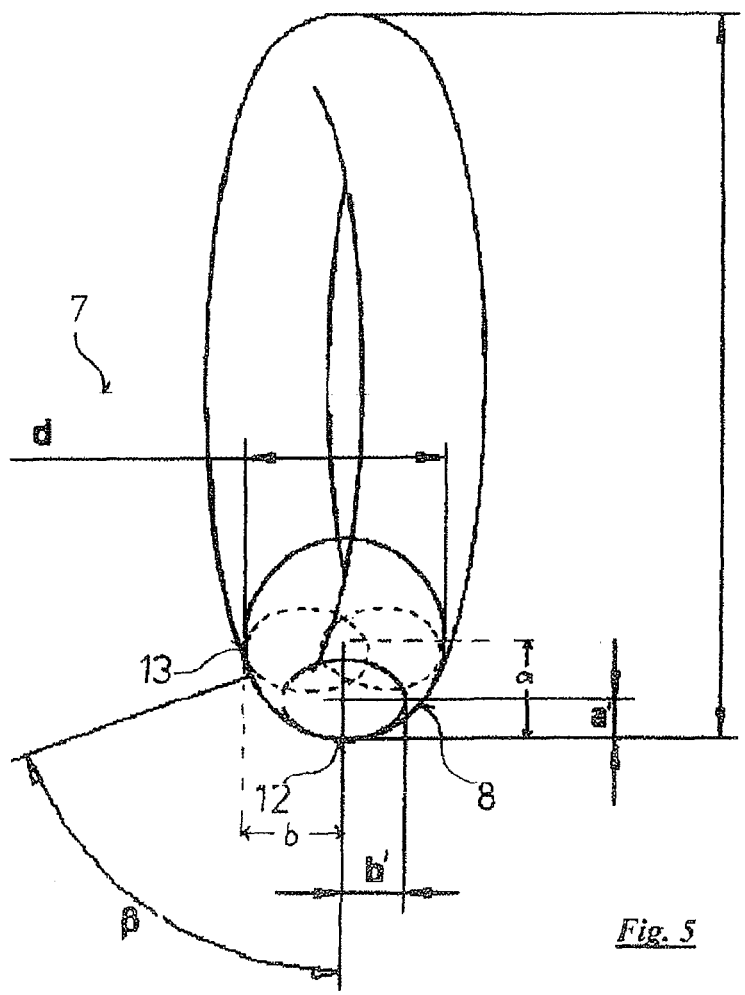

Further advantages, features and possible uses of the present invention will be apparent from the description hereinafter, preferred embodiments and the accompanying Figures in which:

FIG. 1 shows a perspective view of a VL ball hub with ball races at the outer peripheral surface, FIG. 2 shows an end view of the VL ball hub of FIG. 1, FIG. 3 shows a development of the outer peripheral surface of a VL ball hub with the ball races extending inclinedly relative to the axial direction, FIG. 4 shows a section containing the axis of rotation through the side milling cutter with an elliptical cutting profile, and FIG. 5 shows the ball race profile produced by a milling cutter as shown in FIG. 4 when the milling cutter axis is tilted out of the plane of the paper.

Referring to FIG. 1 shown therein is a VL ball hub generally denoted by reference 10, with a central bore 1 which has an internal tooth arrangement 2 and an outer peripheral surface 3 in which a total of 6 ball races 4 extend, the base line 5 of which is at a constant spacing relative to the axis but extends slightly inclinedly relative to the axial direction, that is to say the base lines 5 form helical lines, in which respect however the base 5 of respectively adjacent ball races forms helical lines inclined in opposite directions. The internal tooth arrangement 2 of the ball hub 10 serves for fixedly connecting the ball hub to a shaft, for example a drive shaft connected to an engine or a corresponding drive output shaft which can be connected for example to the wheel of a vehicle. The ball ring which embraces the ball hub and the inside surface of which also has ball races which are slightly inclined in a similar manner with respect to the axial direction (it will be noted however that in each case in opposite relationship to the inclination of the directly opposite ball race in the ball hub) is not shown here. Each of the ball races 4, of which there are six in the present case, accommodates a ball which runs in that ball race 4 and the corresponding opposite ball race of the ball ring (not shown) so that the ball hub and the ball ring are pivotably connected together by way of the balls running in the ball races and disposed between the hub and the ring, and in that case can transmit torque.

FIG. 2 shows an end view on to the ball hub along the axis 6.

FIG. 3 shows a development of the outside periphery of the ball hub shown in FIGS. 1 and 2. The development shows a total of six ball races 4, the base lines 5 of which are respectively inclined alternately in opposite directions with respect to the axis-parallel direction through an angle $\alpha$, wherein that angle $\alpha$ in the specific case is about 15°. The special advantageous properties of VL ball hubs do not need to be further discussed here as those hubs are known per se and are not subject-matter of the present invention.

The present invention however is concerned with a particularly simple and elegant method of producing corresponding ball races for VL joints. For that purpose there is provided a side milling cutter, the profile of which is only diagrammatically illustrated in FIG. 4. It will be appreciated that the elliptical profile of the cutting edges embraces substantially only the outer half of the ellipse shown completely in FIG. 4, or less, and that the respective radially inwardly disposed half of the ellipse is only reproduced to illustrate the elliptical shape, but in actual fact does not have further cutting edges as generally in that region there is the solid material of the milling cutter disk 11. The cutting edges of the elliptical profile, which end in the plane of rotation of the milling cutter at the ends of the milling cutter disk 11, can however as secondary cutting edges 13 also extend a distance radially or also with a slight inward curvature in order to leave behind surfaces which are as smooth as possible in the profile milling operation. In that respect it will be appreciated that the secondary cutting edges 13 should project in the axial direction somewhat beyond the radially adjoining end faces 11a, 11b of the milling cutter disk 11, even if that is not clearly shown in the Figures. The peripheral main cutting edges 12 which extend in approximately axis-parallel relationship produce the base of the ball races 4, wherein the transition between 'main cutting edges' and 'secondary cutting edges' is obviously fluid in the case of such a milling cutter of elliptical profile. The radius of the milling cutter is denoted by R.

In the view shown in FIG. 4 the axis 7 of the milling cutter extends in the plane of the paper. In the view in FIG. 5 the axis 7 of the milling cutter is tilted out of the plane of the paper and at the same time it is possible to see the profile 8 of a ball race 4, which is in the plane of the paper and which is produced by the milling cutter 20. That profile is almost of a circular shape and has a markedly smaller ratio b/a of the first to the second semi-axis of that profile. In that respect it is to be noted that the ellipse of the cutting edge profile, which is additionally shown in FIG. 5, is tilted with respect to the plane of the paper through the same angle as the axis of the side milling cutter so that that ellipse assumes the position shown in broken line while passing through the plane of the paper, for example from the rear forwardly in the view in FIG. 5, or to express that graphically when producing the edge at the left in the Figure of the almost circular profile of the ball race, then when it has half passed through the plane of the paper, it assumes the position shown in solid line and finally, when it almost completely passes out of the plane of the paper, it assumes the broken-line position at the right-hand edge of the ball race profile.

In that respect the ellipses are inclined relative to the plane of the paper so that in the case of the broken-line ellipse at the left, only the left outermost edge (secondary cutting edge 13) is in the plane of the paper and the remainder of the ellipse is behind the plane of the paper, while in the case of the right-hand broken-line ellipse only the right outermost edge is still in the plane of the paper while the remaining part has already passed forwardly through the plane of the paper. The solid-line ellipse corresponds to a position of the milling cutter profile in which the left-hand half is in front of the plane of the paper and the right-hand half is behind that plane, and the lower main cutting edge 12 is just cutting the base of the portion of the ball race, that is in the plane of the paper. The profile of the ball race 4 can be varied as desired by altering the angle α, through which the milling cutter axis is inclined relative to the plane of the paper representing the plane perpendicular to the direction of the ball race.

The angle of inclination is effectively produced by the milling cutter axis 7 being oriented perpendicularly to the axis 6 of the ball hub, the milling cutter being displaced parallel to the axis 6, and in that case at the same time by the ball hub being rotated about its axis, wherein the peripheral speed of the hub relative to the advance speed of the milling cutter in the axis direction of the hub corresponds to the tangent of the angle α. To produce the oppositely directed inclination of adjacent ball races only the direction of rotation of the hub is altered during the advance movement of the milling cutter in the axial direction for the hub.

The crucial advantage of the method according to the invention and the correspondingly designed milling cutter is that in the production of such ball races of VL joints which extend inclinedly relative to the axis of the ball hub, both the ball hub and also the milling cutter can be mounted in a clamping configuration which is respectively fixed with respect to the axis, wherein relative movements occur only along the fixed axes and about the fixed axes so that the ball races of VL joints can be produced in that way very much more easily than with side milling cutters whose plane of rotational movement is inclined in the direction of the ball race and thus at an angle different from zero degrees in relation to the hub axis.

The invention claimed is:

1. A method of milling ball races which are of an approximately elliptical profile which has a first semi-axis extending substantially perpendicularly to the base of the ball race and a second semi-axis extending perpendicularly to the first semi-axis and perpendicularly to the longitudinal direction of the ball race, wherein a side milling cutter is used to produce the ball race, the peripheral cutting edges of which produce the elliptical profile of the ball race, wherein the cutting edges of the side milling cutter in a section containing the axis of the milling cutter are also of an elliptical profile whose first semi-axis extends perpendicularly to the milling cutter axis and whose second semi-axis extends parallel to the milling cutter axis, wherein the ratio of the second semi-axis relative to the first semi-axis of the cutting edges is greater than the ratio of the second semi-axis relative to the first semi-axis in the case of the ball race to be produced, wherein the axis of the side milling cutter in projection on to the portion of the ball race, disposed with the cutting edges of the milling cutter, includes a setting angle different from 0° with the second semi-axis of the ball race profile.

2. A method as set forth in claim 1 wherein both semi-axes of the ball race milling cutter are smaller than each of the semi-axes of the ball race profile produced therewith.

3. A method as set forth in claim 1 wherein the setting angle is set at between 5° and 40°.

4. A method as set forth in claim 1, wherein the semi-axis ratio of the milling cutter cutting edges is between 10% and 300% greater than the semi-axis ratio of the ball race profile.

5. A method as set forth in claim 1, wherein the radius of the side milling cutter is between twice and 12 times the large semi-axis of the profile of the milling cutter cutting edges.

6. A method as set forth in claim 5 wherein the radius of the side milling cutter is between 4 and 8 times the large semi-axis of the profile of the milling cutter cutting edges.

7. A method as set forth in claim 1, wherein the ball race profile in the hub of a VL joint is produced by the axis of the VL hub being set perpendicularly to the axis of the milling cutter and at the same time rotation of the VL hub about its axis being effected during the milling cutter advance along the axial direction of the VL hub, wherein the ratio of the peripheral speed of the VL hub at the base of the ball race to the advance speed of the milling cutter corresponds to the tangent of the setting angle.

8. A ball race milling cutter in the form of a side milling cutter with cutting edges arranged at a disk periphery, which are of an approximately elliptical profile, wherein the ratio of the semi-axis, parallel to the milling cutter axis, of the profile of the cutting edges relative to the semi-axis, extending perpendicularly to the milling cutter axis, of the profile of the cutting edges is between 1.06 and 3.5.

9. A ball race milling cutter as set forth in claim 8 wherein the semiaxis ratio is between 1.1 and 2.5.

10. A ball race milling cutter as set forth in claim 9 wherein the semi-axis ratio is between 1.15 and 2.7.

11. A ball race milling cutter as set forth in claim 8 wherein the radius of the ball race milling cutter is between twice and 12 times the second semi-axis of the profile of the milling cutter cutting edges.

12. A ball race milling cutter as set forth in claim 11 wherein the radius of the milling cutter is between 4 and 8 times the second semi-axis of the profile of the milling cutter cutting edges.

13. A method as set forth in claim 3 wherein the setting angle is set at between 10° and 30°.

* * * * *